(12) United States Patent
Seiller et al.

(10) Patent No.: US 8,727,413 B2
(45) Date of Patent: May 20, 2014

(54) STORAGE COMPARTMENT

(75) Inventors: Julien Seiller, Karlsruhe (DE); Nicolas Allard, Brie (FR); Thierry Benard, Beauvais (FR); Nicolas Pegorier, Saint-Ouen (FR)

(73) Assignee: Faurecia Innenraum Systeme GmbH (DE)

( * ) Notice: Subject to any disclaimer, the term of this patent is extended or adjusted under 35 U.S.C. 154(b) by 662 days.

(21) Appl. No.: 12/988,262

(22) PCT Filed: Apr. 16, 2009

(86) PCT No.: PCT/EP2009/002973
§ 371 (c)(1),
(2), (4) Date: Nov. 14, 2011

(87) PCT Pub. No.: WO2009/127439
PCT Pub. Date: Oct. 22, 2009

(65) Prior Publication Data
US 2012/0061983 A1 Mar. 15, 2012

(30) Foreign Application Priority Data
Apr. 16, 2008 (DE) .......... 10 2008 019 867

(51) Int. Cl.
*B60R 13/00* (2006.01)
(52) U.S. Cl.
USPC ..................................... 296/24.34
(58) Field of Classification Search
USPC ........ 296/24.34, 37.1, 37.8; 206/315.11, 335, 206/534
See application file for complete search history.

(56) References Cited

U.S. PATENT DOCUMENTS

| | | | |
|---|---|---|---|
| 6,366,672 B1 | 4/2002 | Tsay | |
| 7,240,941 B2 | 7/2007 | Adams et al. | |
| 7,264,297 B2 * | 9/2007 | Boulard et al. | 296/100.1 |
| D636,749 S * | 4/2011 | Kucera | D14/132 |
| 7,922,228 B2 * | 4/2011 | Spitler et al. | 296/24.34 |
| 7,931,322 B2 * | 4/2011 | O'Brien et al. | 296/24.34 |
| 7,931,505 B2 * | 4/2011 | Howard et al. | 439/680 |
| 7,954,663 B2 * | 6/2011 | DePue | 220/813 |

(Continued)

FOREIGN PATENT DOCUMENTS

| | | |
|---|---|---|
| DE | 100 48 587 | 4/2002 |
| DE | 101 25 726 | 12/2002 |

(Continued)

OTHER PUBLICATIONS

International Application Serial No. PCT/EP2009/002973, International Search Report and Written Opinion issued Apr. 22, 2010, 20 pgs.

(Continued)

*Primary Examiner* — Kiran B Patel
(74) *Attorney, Agent, or Firm* — Schwegman Lundberg & Woessner, P.A.

(57) ABSTRACT

The present invention relates to a storage compartment for a vehicle interior, comprising a cover (2) that can be pivoted between a completely closed and a maximally opened position, and a base (3) that is hidden below in case of the cover (2) being closed, wherein the cover (2) may be locked between the completely closed and the maximally opened position at any desired intermediate position, at least within a partial region of a movement tolerance, for holding an object (6) between the base (3) and the cover (2).

10 Claims, 3 Drawing Sheets

(56) References Cited

U.S. PATENT DOCUMENTS

Figure 1:
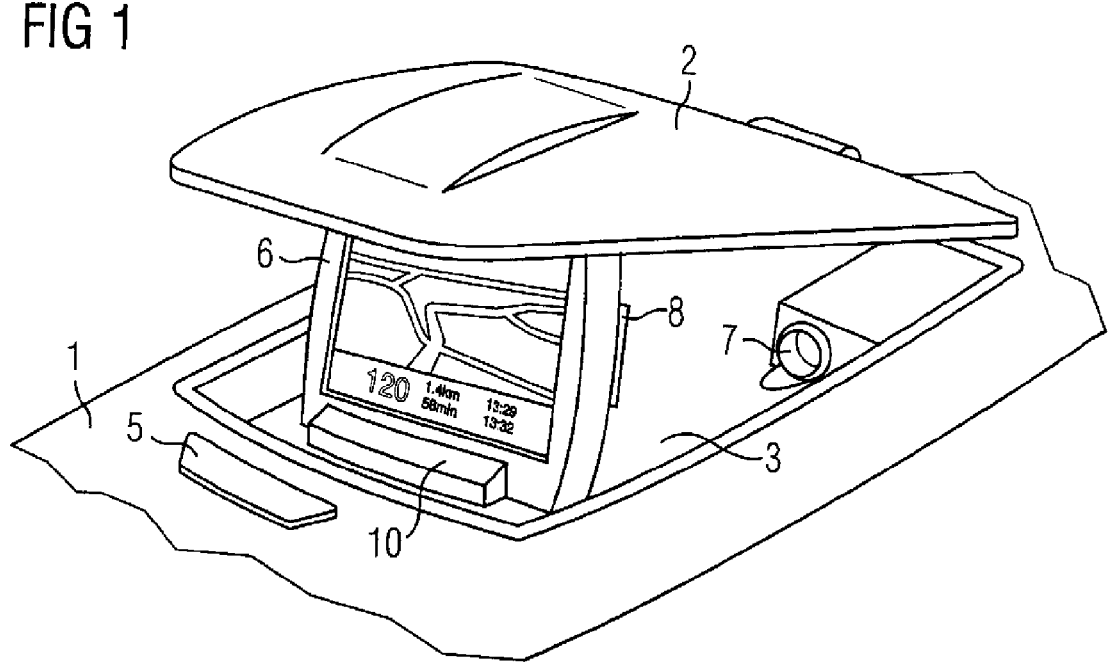

| | | | | |
|---|---|---|---|---|
| 8,070,224 B2* | 12/2011 | Vitito | | 297/217.3 |
| 8,074,832 B2* | 12/2011 | Fujiwara et al. | | 220/811 |
| 8,100,453 B2* | 1/2012 | Shimajiri | | 296/37.8 |
| 8,167,348 B2* | 5/2012 | Fesenmyer | | 296/24.34 |
| 8,167,366 B2* | 5/2012 | Charpentier et al. | | 297/125 |
| 8,196,985 B2* | 6/2012 | Penner et al. | | 296/24.34 |
| 8,210,592 B2* | 7/2012 | Spitler et al. | | 296/37.8 |
| 2002/0089217 A1* | 7/2002 | Scheerhorn | | 297/188.19 |
| 2003/0052501 A1* | 3/2003 | Schmidt et al. | | 296/37.13 |
| 2006/0050018 A1* | 3/2006 | Hutzel et al. | | 345/60 |
| 2006/0066118 A1* | 3/2006 | Radu et al. | | 296/37.8 |
| 2006/0071497 A1* | 4/2006 | Radu et al. | | 296/24.34 |
| 2006/0108816 A1* | 5/2006 | Radu et al. | | 296/24.34 |
| 2006/0175863 A1* | 8/2006 | Evans | | 296/100.08 |
| 2007/0096499 A1* | 5/2007 | Zajicek et al. | | 296/100.06 |
| 2007/0108079 A1* | 5/2007 | Zajicek et al. | | 206/467 |
| 2007/0236036 A1* | 10/2007 | Downey | | 296/37.1 |
| 2007/0257507 A1* | 11/2007 | Hobrecht | | 296/100.08 |
| 2007/0295875 A1* | 12/2007 | Haddad et al. | | 248/311.2 |
| 2008/0007079 A1* | 1/2008 | Sturt et al. | | 296/24.34 |
| 2008/0061575 A1* | 3/2008 | Mahaffy | | 296/24.34 |
| 2008/0100087 A1* | 5/2008 | Terhaar et al. | | 296/100.06 |
| 2008/0238133 A1* | 10/2008 | Hobrecht et al. | | 296/136.03 |
| 2009/0058120 A1* | 3/2009 | Ioka et al. | | 296/24.34 |
| 2009/0066103 A1* | 3/2009 | Koarai | | 296/24.34 |
| 2009/0072565 A1* | 3/2009 | Mayne, Jr. | | 296/24.34 |
| 2009/0115215 A1* | 5/2009 | Abro et al. | | 296/24.34 |
| 2009/0134649 A1* | 5/2009 | Boreanaz et al. | | 296/24.34 |
| 2009/0174206 A1* | 7/2009 | Vander Sluis et al. | | 296/24.34 |
| 2009/0174207 A1* | 7/2009 | Lota | | 296/24.34 |
| 2009/0218840 A1* | 9/2009 | Vasko et al. | | 296/24.34 |
| 2010/0066113 A1* | 3/2010 | Browne et al. | | 296/24.34 |
| 2010/0078954 A1* | 4/2010 | Liu et al. | | 296/24.34 |
| 2010/0090491 A1* | 4/2010 | Hipshier et al. | | 296/24.34 |
| 2010/0156128 A1* | 6/2010 | Dexter et al. | | 296/24.34 |
| 2010/0156129 A1* | 6/2010 | Evans et al. | | 296/24.34 |
| 2010/0201147 A1* | 8/2010 | Jones et al. | | 296/24.34 |
| 2010/0244482 A1* | 9/2010 | Montagna et al. | | 296/100.02 |
| 2010/0314896 A1* | 12/2010 | Skibinski et al. | | 296/24.34 |
| 2011/0115250 A1* | 5/2011 | Hobrecht et al. | | 296/136.03 |
| 2011/0121596 A1* | 5/2011 | Beyer | | 296/24.34 |
| 2011/0215606 A1* | 9/2011 | Trivedi | | 296/24.34 |
| 2011/0309651 A1* | 12/2011 | Hernandez et al. | | 296/100.08 |
| 2012/0043778 A1* | 2/2012 | Brant | | 296/24.34 |
| 2012/0230047 A1* | 9/2012 | Smith et al. | | 362/543 |
| 2012/0261936 A1* | 10/2012 | Spitler et al. | | 296/24.34 |
| 2012/0318796 A1* | 12/2012 | Doll | | 220/211 |
| 2013/0008930 A1* | 1/2013 | Hipshier et al. | | 224/275 |
| 2013/0020825 A1* | 1/2013 | Yamada et al. | | 296/37.16 |
| 2013/0057011 A1* | 3/2013 | Yamagishi et al. | | 296/24.34 |

FOREIGN PATENT DOCUMENTS

| | | |
|---|---|---|
| DE | 202 15 067 | 1/2003 |
| EP | 0 795 437 | 9/1997 |
| FR | 2 755 921 | 5/1998 |
| WO | WO-2005/077709 | 8/2005 |

OTHER PUBLICATIONS

International Application No. PCT/EP2009/002973, English translation of International Preliminary Report on Patentability issued Nov. 9, 2010, 11 pgs.

International Application No. PCT/EP2009/002973, International Preliminary Report on Patentability mailed Oct. 28, 2010, 10 pgs.

* cited by examiner

STORAGE COMPARTMENT

PRIORITY CLAIM TO RELATED APPLICATIONS

This application is a national stage application under 35 U.S.C. §371 of PCT/EP2009/002973, filed Apr. 16, 2009, and published as WO 2009/127439 A2 on Oct. 22, 2009, which claims priority to German Application No. 10 2008 019 867.6, filed Apr. 16, 2008, which applications and publication are incorporated herein by reference and made a part hereof in their entirety, and the benefit of priority of each of which is claimed herein.

The invention relates to a storage compartment for a vehicle interior according to the preamble of the main claim. Furthermore, the invention relates to a trim part for a vehicle interior having a corresponding storage compartment.

Such storage compartments having a cover which can be pivoted between a completely closed and a maximally opened position and having a base which is concealed thereunder when the cover is closed are known per se, for example in the form of glove compartments which are integrated in instrument panels. In such storage compartments, objects can be securely stored during a journey so that, in the case of a collision or sharp braking, the objects can be prevented from flying around.

Independently thereof, it is known to secure provisionally in a vehicle interior supplementary devices which are independent of the corresponding vehicle, such as for example mobile telephones, mobile navigation devices or other handheld devices, in particular hand-held devices designed for wireless communication (so-called nomadic devices) such that they can be operated during the journey. Merely one of many possibilities thereby resides for example in the use of suction cups. Devices mounted merely provisionally in this way in the vehicle interior generally become detached however even during merely a minor collision and then, flying freely through the vehicle interior, constitute great danger for the vehicle passengers. Conventionally, this danger has only been able to be countered by secure storage of such devices, for example in closable storage compartments, operation of the devices during the journey disadvantageously no longer being possible.

The object therefore underlying the present invention is to propose a measure with which devices of the described type which do not belong to the fixed equipment of a vehicle should be fitted in a vehicle interior provisionally—i.e. detachable at any time—such that, during a journey, they can be operated by the vehicle passengers and at the same time are fixed so securely that they do not become detached even in the case of a collision and hence do not constitute a danger for the vehicle passengers. Furthermore, the object underlying the invention is to develop a trim part having a corresponding storage compartment.

This object is achieved according to the invention by a storage compartment having the characterising features of the main claim in conjunction with the features of the preamble of the main claim and also by a trim part according to claim 11. Advantageous embodiments and developments of the invention are revealed in the features of the sub-claims.

It is therefore proposed that the cover, in the case of a storage compartment of the initially described type, can be locked at least within a partial region of a movement range between the completely closed and the maximally opened, typically pivoted upwards, position of the cover in any intermediate position for retaining an object between the base and the cover. This makes it possible to clamp a device of the above-mentioned type, irrespective of a precise size of this device, between the base of the storage compartment and the then typically half-opened cover such that the device is fixed exceptionally securely and, at the same time, a typically present operating surface of the device can be reached by a vehicle passenger without the latter requiring to detach the device from its fixing. Also a display possibly present on the device can be visible then, with skilful positioning of the device, for a driver or another vehicle passenger without difficulty. An object thus retained between the cover and the base will typically have direct contact with the base of the storage compartment but instead can also rest by a lower end on a support or retaining strap disposed above the base. Furthermore, the proposed storage compartment is suitable of course not only for fixing objects in the described manner but rather can be used in addition also like a normal storage compartment for storing objects and, in this respect, can be used advantageously in many ways.

One embodiment which is constructionally particularly simple, is produced if the cover can be pivoted upwards about a simple pivot axis. For other applications, kinematics of the cover can be desirable, which allows an upward pivoting movement with a translatory component. For this purpose, the cover can be designed to be pivotable upwards about a double link or else be articulated by means of a four-bar link. Such a four-bar link which can be produced for example by two or four pivotable members disposed between the cover and a carrier confers the advantage of an exceptionally robust connection of the cover.

In order to produce lockability of the cover in the intermediate positions with little complexity, at least one link, about which the cover can be pivoted upwards, can have a releasable lock which locks the link in a locking position in a form fit. In addition, it can be advantageous if the cover is loaded by a spring force which opens or closes the cover. Such a spring force which can be produced by a simple spring cooperating with at least one link of the cover can, in the first case, facilitate opening of the storage compartment and, in the second case, help in the fixing of the object between the base and the cover. Possibly, it can suffice for locking the cover in the intermediate position if a counterforce of the spring closing the cover is exerted by the object to be retained itself. An inherent locking mechanism can then even be superfluous. With respect to as secure fixing of the object as possible, embodiments of the invention should however be preferred in which the cover can be locked in each of the mentioned intermediate positions irrespective of an object disposed between base and cover.

The formulation, as a result of which the cover can be locked at least within the mentioned partial region in any intermediate position, is intended to include the possibility that, between adjacent intermediate positions in which the cover can be locked, in fact a finite spacing exists but this does not exceed a value of 1 mm. An intermediate position which can be chosen to be infinitely variable is preferred in any event, which can be achieved in any case if no locking which locks in a form fit but rather a link brake which locks the cover by friction is provided.

In order to enable as secure fixing as possible of the object to be retained between the base and the cover and to retain this object also in a form fit, the cover can have, on an inner side orientated towards the base, a plurality of webs which are disposed parallel to each other and to at least one link axis of the cover. These webs can be designed to be pressed in elastically, for example in the shape of hoops which extend freely between two connection points in order to enable as convenient fixing as possible of the object in the partially opened storage compartment. Alternatively or additionally, the webs can be covered for this purpose also with a flexible covering, for example with an elastomer film.

An even more convenient fixing of the object between the cover and the base, which can be implemented also with one hand, can be made possible by a support, which can be pivoted upwards about at least one link, for the object to be retained between the base and the cover being disposed on the base of the storage compartment. The object can then firstly be supported against this support in order subsequently to be fixed by pivoting the cover shut. For an even more secure fixing of the object, the support can in addition be configured with at least one retaining strap for the object to be retained and/or with a support wall which has an adhesive pad or an adhesive film or a magnetic surface of a sufficiently smooth suction surface for a suction cup. If the support wall has a magnetic surface, i.e. comprises a permanently magnetic layer or has an electromagnet which can produce a magnetic field on a surface of the support wall, objects made of magnetisable material can be placed particularly easily between the cover and the base.

A particularly versatile possibility for use of the storage compartment can be achieved if such a support comprises furthermore a plate serving as support wall for the object, which plate should be mounted on a frame of the support in two orientations which are different from each other by interchanging a front- and a rear-side of the plate, the plate having, on the front-side, at least one retaining strap and, on the rear-side, a surface formed by an adhesive pad or an adhesive film or a magnetic surface or a suction surface for a suction cup. Such a plate can be configured for example such that it can be inserted from the top into a rail or two rails of the frame. According to the dimensioning and surface property of an object to be retained, the plate can then be orientated such that the object comes to be situated on the front- or rear-side, according to wherever a better support is ensured.

Within the storage compartment, a socket for a supply cable, for example a 12 V socket, can be provided in addition in order to enable a voltage supply to the object clamped between the cover and the base if an electrical or electronic device such as for example a nomadic device is thereby involved. Alternatively or additionally, also other sockets can be provided within the storage compartment, for example a socket for a signal cable. In these cases, supply or connection of a device fixed by means of the storage compartment is advantageously possible by this device being able to be stored in the storage compartment after use in a very simple manner by complete closing of the storage compartment without it requiring to be unplugged for this purpose. An advantageous development provides that, in the immediate vicinity of a socket of the described type within the storage compartment, a further, possibly coverable sub-compartment is provided, in which sub-compartment a cable which corresponds to the socket and possibly is inserted there can be stored. This sub-compartment can be recessed for example in the base of the actual storage compartment.

Typically, a storage compartment of the described type is a component of a correspondingly shaped trim part for a vehicle interior, which can involve for example an instrument panel or a central console or a part of an instrument panel or a central console.

Embodiments of the invention are explained subsequently with reference to FIGS. 1 to 6. There are shown FIG. 1 a perspective view of a storage compartment in an embodiment of the invention, FIG. 2 a longitudinal section through the storage compartment of FIG. 1, FIG. 3 a perspective representation of a detail of a corresponding storage compartment in a modification of the embodiment of FIGS. 1 and 2, FIG. 4 a longitudinal section through a storage compartment in another embodiment of the invention, FIG. 5 a perspective view of a support integrated in the storage compartment of FIG. 4 and FIG. 6 a longitudinal section through a further embodiment of a comparable storage compartment.

The storage compartment shown in FIG. 1 is disposed on an upper side of an instrument panel 1 of a motor car in which it is integrated. This storage compartment which can alternatively also be integrated in a central console has a cover 2 which can be pivoted between a completely closed and a maximally opened position, which cover is shown in FIG. 1 in a half-opened state. A base 3 of the storage compartment which is concealed under the cover 2 when the cover 2 is closed is also detectable.

The cover 2 is articulated on a part of the instrument panel 1 which surrounds it and serves as carrier for the cover 2 such that it can be locked in any intermediate position between the completely closed and the maximally opened position of the cover 2. In the present case, the cover 2 is articulated for this purpose by means of a double link 4, detectable in FIG. 2, on the surrounding part of the instrument panel 1, this double link 4 having, for locking the cover 2, a link brake which can be released by pressing a push button 5 which is detectable in front of the storage compartment so that the cover 2 can be freely pivoted open or shut after pressing the push button 5 whilst the link brake prevents movement of the double link 4 when the push button 5 is not pressed. Thus an object 6 not belonging itself to the storage compartment can be clamped between the cover 2 and the base 3 and hence be retained securely.

The object 6 shown by way of example in the Figures concerns a navigation device designed as a hand-held device. Similarly also other hand-held devices, such as for example mobile telephones or other nomadic devices, can be fixed between the cover 2 and the base 3 of the storage compartment such that they are retained sufficiently securely, on the one hand, so as not to be released even during an accident, whilst they can be reached and viewed well by a vehicle passenger, on the other hand. In FIG. 1, also a socket 7 can be detected in FIG. 1 within the storage compartment, which socket concerns here a 12 V voltage supply into which a supply cable of a device forming the object 6 can be inserted. Alternatively or additionally, the storage compartment can also have a corresponding socket 7 for a signal cable. In addition to the socket 7, a sub-compartment detectable only in FIG. 2 and indicated there in broken lines is recessed furthermore into the base 3 of the storage compartment in which a cable corresponding to the socket 7 can be stored when it is not required. This sub-compartment can be configured to be closable for example with a flap.

Figure 2:
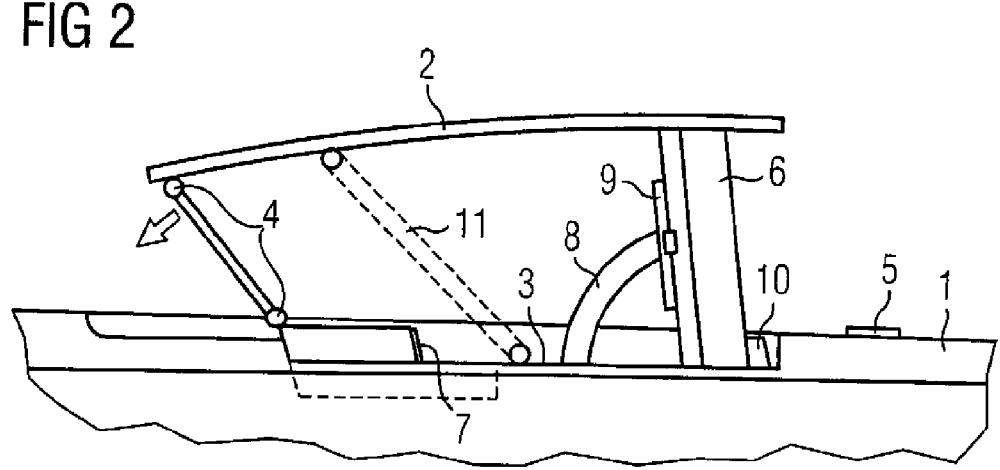

In the longitudinal section, shown in FIG. 2, through the storage compartment of FIG. 1, a support 8 which is disposed on the base 3 of the storage compartment and can be pivoted upwards here about a link designed as a sliding link can furthermore be detected, which support has a support wall 9 which is provided with an adhesive pad or an adhesive film or a suction surface for a suction cup or a magnetic surface, on which the subject 6 is supported. The support wall 9 can in addition carry an inscription with safety advice for recommended use of the described fixing possibility. In addition, the support 8 includes a retaining strap 10 designed here as a strip on the base 3 of the storage compartment for the object 6 to be retained.

In the case of a slight modification to the previously described storage compartment, the cover 2 can be articulated by a four-bar link which is produced by providing two additional members 11, one of which is illustrated in broken lines in FIG. 2. It can also be provided that, instead of the previously mentioned link brake, a lock which locks the double link 4 or the four-bar link taking the place thereof in a form fit and can be released by the push button 5 serves to lock the cover 2 in the completely closed, the maximally opened or any position situated therebetween. In the case of the present embodiment, the cover 2 is loaded in addition by a spring force opening this cover 2 after pressing on the push button 5, for which purpose the double link 4 cooperates with a simple spring. In the case of a modification to the illustrated embodiment, instead also a spring closing the cover 2 can be provided, which spring then also exerts a pressure, which retains the object 6, on this object 6 to be retained between cover 2 and the base 3.

Figure 3:
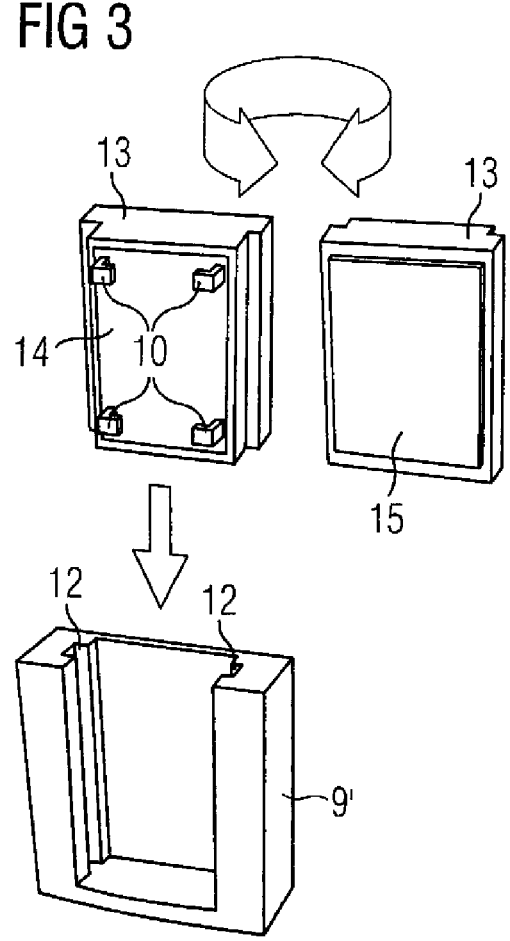

In FIG. 3, two components of a support corresponding to the support 8 of FIG. 2 are shown for a corresponding storage compartment in a modification to the described storage compartment. A mounting 9' can be detected there, which takes the place of the support wall 9 of the embodiment of FIG. 2. This mounting 9' has two groove-shaped rails into which a plate 13 can be inserted and in fact in two different orientations which differ from each other by interchanging a front-side 14 and a rear-side 15 of the plate 13. On the front-side 14, the plate 13 has four retaining straps 10 which serve to retain a device of defined standard dimensions. The rear-side 15 of the plate 13, in contrast, is formed by an adhesive pad or an adhesive film or a magnetic surface or a suction surface for a suction cup and, if required, provides other objects 6 with a secure support. In FIG. 3, the plate 13 is represented in both orientations in which it can be inserted, as required, into the mounting 9'.

Figure 4:
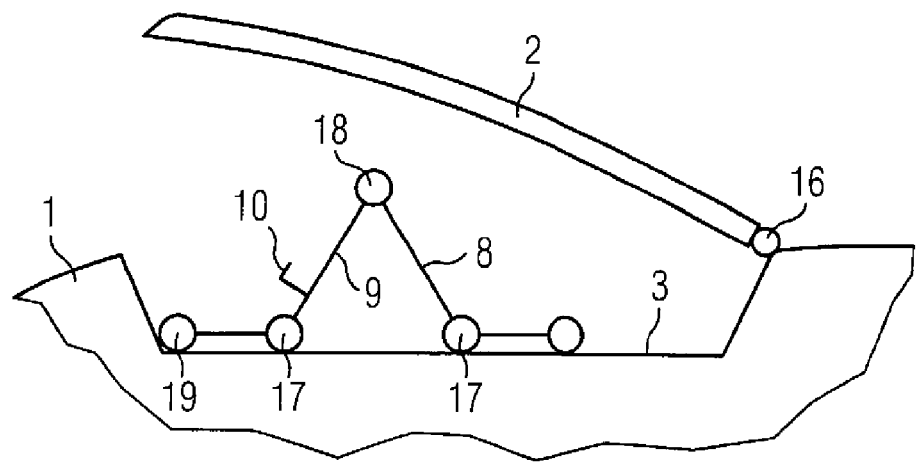

A longitudinal section through another embodiment of a comparable storage compartment can be detected in FIG. 4. Recurring features there and in the following Figures are provided again with the same reference numbers without being mentioned in detail each time. The cover 2 which can be pivoted upwards is articulated here on the instrument panel 1 about a simple pivot axis 16. Also in this embodiment, it is achieved by a link brake or a releasable lock that the cover 2 can be locked in any intermediate position between a completely closed and a maximally opened position for retaining an object between the base 3 and the cover 2.

A support 8, which can be pivoted upwards here about two links 17, for the object to be retained is also disposed on the base 3 of this storage compartment. A support wall 9 which is provided for supporting the object to be retained and which again has a retaining strap 10 for the object to be retained is connected via a further link 18 to a further wall of the support 8. On a front end 19, the support 8 can be connected securely to the base 3 of the storage compartment in order to prevent the support 8 slipping backwards. By straightening the links 17 and 18, the support 8 can abut in a planar manner against the base 3 of the storage compartment in which then enough room still remains for the objects to be stored and above which the cover 2 can then be closed completely.

Figure 5:
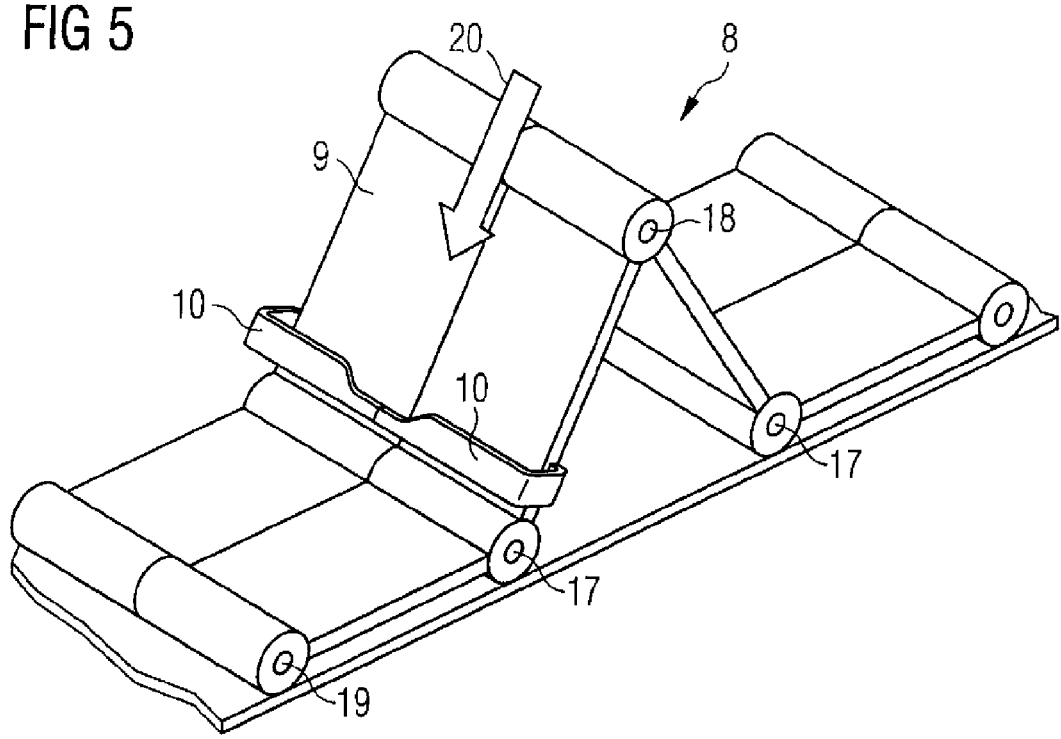

A perspective view of the support 8 of FIG. 4 is represented in FIG. 5. An arrow 20 there illustrates from which direction an object which is to be retained between the cover 2 and the base 3 of the storage compartment and thereby remains accessible from outside can be introduced into the retaining strap 10.

Figure 6:
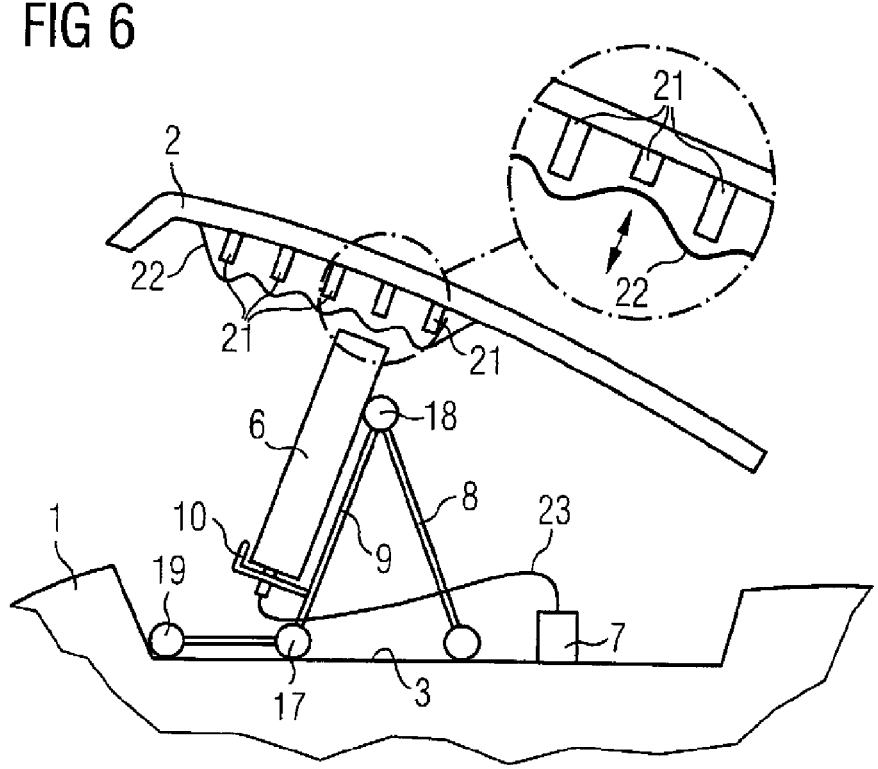

In another embodiment of the invention, a further storage compartment is finally represented in FIG. 6, again an illustration corresponding to FIG. 4 being chosen and recurring features being provided with the same reference numbers. Also the cover 2 of this storage compartment can be locked in any intermediate position between a completely closed and a maximally opened position of the cover 2. On an inner side orientated towards the base 3 of the storage compartment, the cover 2 of this storage compartment has a plurality of webs 21 which are disposed parallel to each other and to at least one link axis of the cover 2, not illustrated here. These webs can be pressed in elastically, which is produced, in the present embodiment, by the webs 21 being configured as hoops which extend perpendicular to the drawing plane and are connected only by their ends to the cover 2, for example formed by metal strips. Furthermore, the webs 21 are covered with a common flexible covering 22 which covers all the webs 21 and is formed from an elastomer film. Together with the flexible covering 22, the webs 21 provide a secure support for an object 6 which is clamped between the base 3 and the cover 2 after the cover 2 has been pressed on and locked at the top on the object 6 previously introduced into the strap 10. In FIG. 6, a supply cable 23 which is inserted in a socket 7 for supplying the object 6 with a 12 V voltage is also represented in FIG. 6.

What is claimed is:

1. A storage compartment for a vehicle interior, said storage compartment comprising:
   a cover, which is capable of being pivoted between a completely closed and a maximally opened position,
   a base which is concealed under the cover when the cover is closed, wherein the cover is capable of being locked at least within a partial region of a movement range between the completely closed and the maximally opened position in any intermediate position for retaining an object between the base and the cover, and
   a support disposed on the base and capable of being pivoted upwards about at least one link, the support including a support wall extending therefrom for supporting the object between the base and the cover.

2. The storage compartment according to claim 1, wherein the cover is capable of being pivoted upwards about a simple pivot axis or a double link or is articulated using a four-bar link.

3. The storage compartment according to claim 2, wherein at least one link, about which the cover can be pivoted upwards, includes a link brake or a releasable lock that locks the link in a form fit to lock the cover in at least one of the intermediate positions.

4. The storage compartment according to claim 1, wherein the cover is loaded by a spring force that opens or closes the cover.

5. The storage compartment according to claim 1, wherein the support further includes at least one retaining strap for the object to be retained.

6. The storage compartment according to claim 5, wherein the support wall is provided with at least one of an adhesive pad or an adhesive film or a suction surface for a suction cup or a magnetic surface.

7. The storage compartment according to claim 1, wherein at least one socket for a supply or signal cable is disposed within the storage compartment.

8. The storage compartment according to claim 1, wherein the storage compartment is included in a trim part for a vehicle interior.

9. The storage compartment according to claim 1, wherein the storage compartment is included in a trim part comprising at least one of an instrument panel or a central console or a part of an instrument panel or of a central console.

10. The storage compartment according to claim 1, wherein the cover is spring loaded and capable of being pivoted upwards about a simple pivot axis or a double link or is articulated using a four-bar link, wherein at least one link includes at least one of a link brake or a releasable lock that locks the link in a form fit to lock the cover in at least one of the intermediate positions, the storage compartment further comprising:
- a retaining strap, in association with the support, the retaining strap configured for the object to be retained;
- at least one of an adhesive pad or an adhesive film or a suction surface for a suction cup or a magnetic surface, provided on the support wall;
- at least one socket, for a supply or a signal capable, disposed within the storage compartment; and
- wherein the storage compartment is included in a trim part for a vehicle interior, wherein the trim part comprises all or part of at least one of an instrument panel or a central console.

* * * * *